United States Patent
Kasselmann

[15] 3,673,875
[45] July 4, 1972

[54] HYDRAULIC RATE GYRO FOR AN ADAPTIVE STEERING SYSTEM

[72] Inventor: John T. Kasselmann, Southfield, Mich.
[73] Assignee: The Bendix Corporation
[22] Filed: March 19, 1970
[21] Appl. No.: 20,962

[52] U.S. Cl.................................................74/5.43, 74/5.7
[51] Int. Cl.................................................G01c 19/52
[58] Field of Search ......................74/5, 5.6, 5.7, 5.43; 308/9

[56] References Cited

UNITED STATES PATENTS

| | | | |
|---|---|---|---|
| 2,133,809 | 10/1938 | Carter et al. | 74/5.7 X |
| 3,320,816 | 5/1967 | Johnston | 74/5.7 X |
| 3,115,784 | 12/1963 | Parker | 74/5.7 X |
| 3,487,701 | 1/1970 | Chang et al. | 74/5 |
| 2,729,106 | 1/1956 | Mathiesen | 74/5.7 X |
| 3,362,233 | 1/1968 | Posingies | 74/5.43 X |
| 3,435,688 | 4/1969 | Ogren | 74/5.6 |
| 3,451,289 | 6/1969 | Edmonds et al. | 74/5.6 X |
| 3,492,879 | 2/1970 | Riordan et al. | 74/5.6 |

Primary Examiner—Manuel A. Antonakas
Attorney—John R. Benefiel and Plante, Hartz, Smith & Thompson

[57] ABSTRACT

A rate gyro providing a fluidic output signal corresponding to the yaw rate of a vehicle, for use in an adaptive steering system. The gyro rotor is hydraulically supported and spun via tangential reaction jets connected in parallel with flapper nozzles situated to provide both a differential pressure signal corresponding to yaw rate and a centering spring force creating gyro natural frequencies well above the disturbance frequencies encountered. The support, jet, and nozzle fluid supplies are all incorporated into the power steering supply circuit.

6 Claims, 4 Drawing Figures

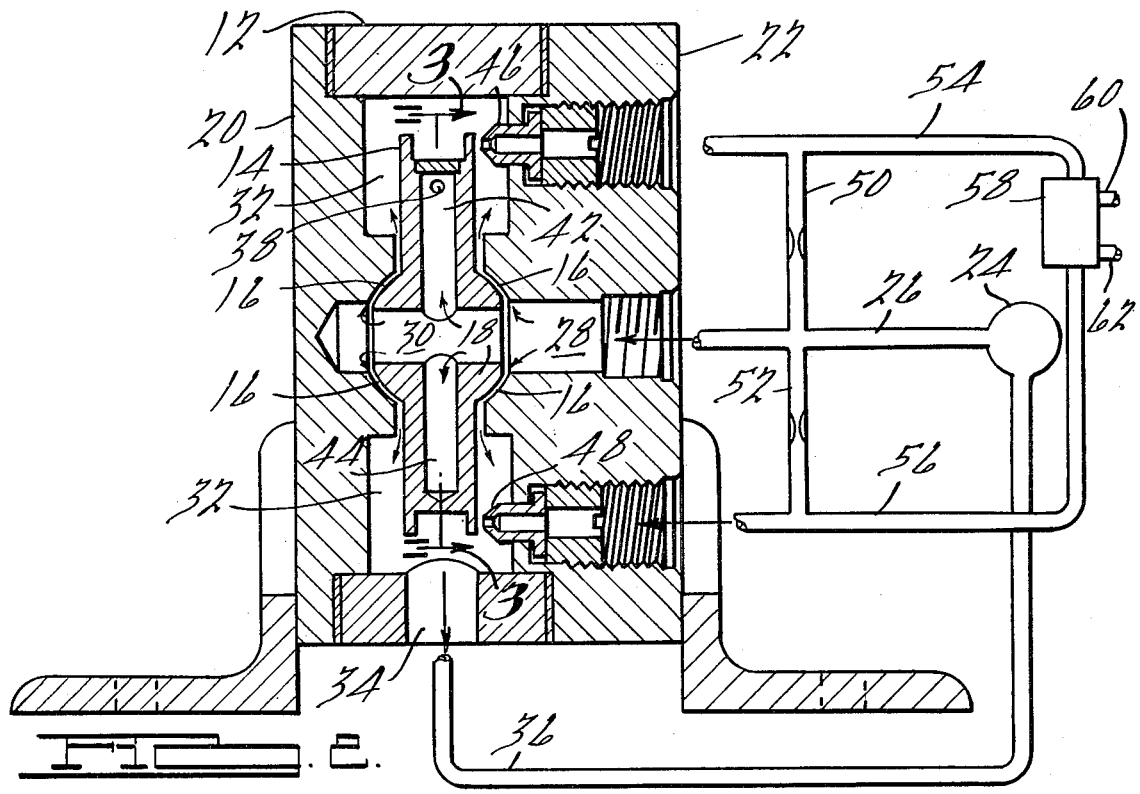
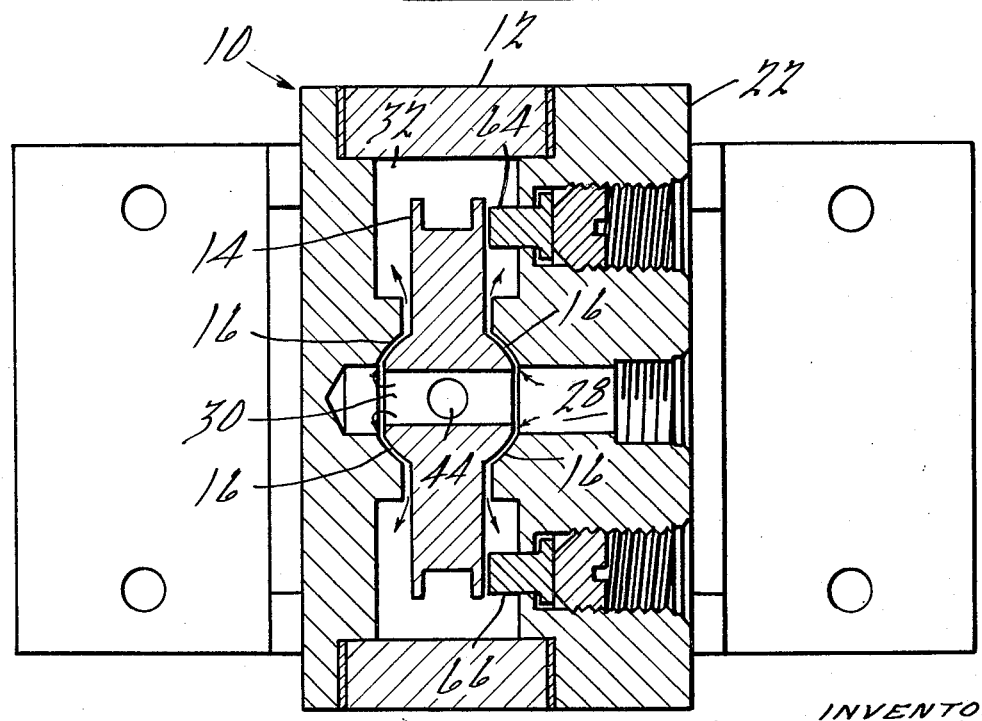

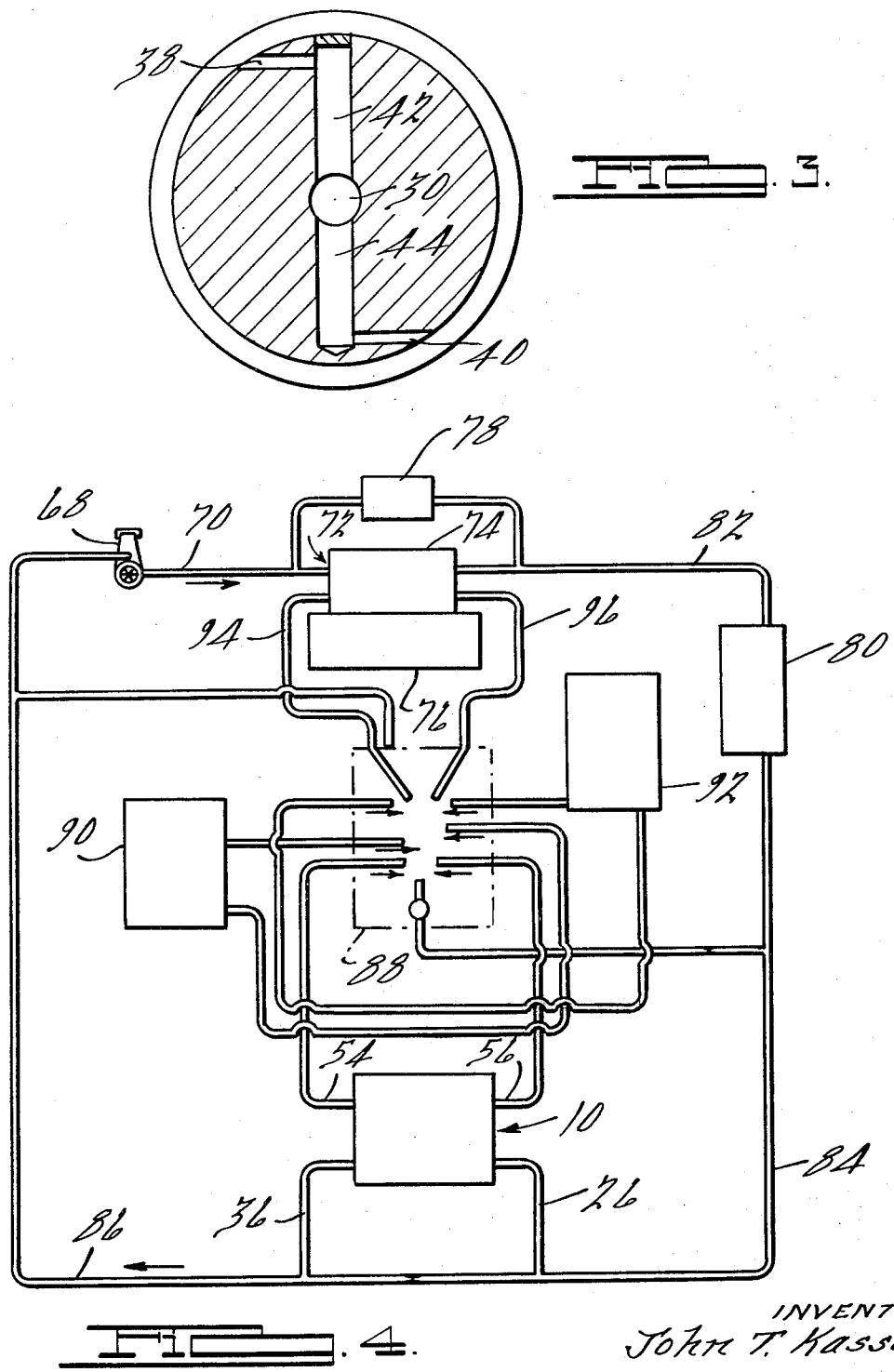

3,673,875

HYDRAULIC RATE GYRO FOR AN ADAPTIVE STEERING SYSTEM

BACKGROUND OF THE INVENTION

Adaptive steering systems have been proposed, in which lateral disturbances imposed on a vehicle are automatically compensated for by various control arrangements, copending U.S. applications, Ser. Nos. 792,238, 792,243, and 792,904, all assigned to the assignee of the present application, disclosing such adaptive steering systems in detail.

These systems, including those disclosed in the U.S. applications referred to above, usually require some means of sensing the rate of vehicle yaw and providing a corresponding output signal compatible with the control system. In the past, aircraft type gyros have been proposed for this purpose, but these are usually relatively expensive for automotive applications and may lack sufficient reliability in the low maintenance environment encountered in private automobile usage.

In addition, the potential advantages of fluidic controls in these areas has led to the development of fluidic adaptive control systems as disclosed in the above-referenced applications. In this context, a means for producing directly a fluidic output signal indicative of vehicle yaw rate would eliminate the need for conversion of the electrical signals usually produced by the aircraft rate gyros into fluidic signals.

These requirements are met by the vortex rate sensor described in the above referenced applications, but this device in its present form produces output signals which require a great deal of amplification before being usable in these systems, hence introducing a complicating factor.

Therefore, it is an object of the present invention to provide a simple, reliable, yaw rate sensor which will produce fluidic output signals of sufficient magnitude that little or no amplification is required for usability in an adaptive steering control system.

SUMMARY OF THE INVENTION

This object and others which will become apparent upon a reading of the following specification and claims is accomplished by providing a gyro having a rotor that is hydraulically supported, centered, and spun by means of fluid pressure supplied by the power steering supply circuit, with flapper nozzles similarly supplied with fluid pressure disposed adjacent the rotor to provide a rotor centerforce creating a natural frequency in the yaw mode well above the disturbances to be created, and to provide a differential pressure signal indicative of the yaw rate.

DESCRIPTION OF THE DRAWINGS

FIG. 1 is a front elevational view in section of a hydraulic rate gyro according to the present invention.

FIG. 2 is a plan view in section of the hydraulic rate gyro shown in FIG. 1 together with a schematic representation of a fluid supply circuit.

FIG. 3 is a view of the section taken along the line 3—3 in FIG. 2.

FIG. 4 is a schematic representation of an adaptive control fluid circuit utilizing the hydraulic rate gyro of the present invention incorporated into a conventional power steering fluid supply system.

DETAILED DESCRIPTION

In the following detailed description certain specific terminology will be used for the sake of clarity and a specific embodiment described in order to provide a clear understanding of the invention, but it is to be understood that the invention is not so limited and may be practiced in a variety of forms and embodiments.

Referring to the drawings, and particularly FIGS. 1–3, the hydraulic rate gyro 10 includes a housing 12 within which is supported a rotor 14.

The rotor 14 is pivotally supported by fluid flow through the clearance spaces 16 between the rotor hub 18 and housing end plates 20, 22 formed with complementary spherical surfaces. This arrangement provides for fluid support while also serving to center the rotor 14, by the Bernoulli forces created by the fluid flow through the clearance spaces 16.

The fluid is supplied from pressure sources 24, conduit 26, and passage 28 communicating with axial opening 30 formed in the rotor hub 18. Fluid flow then occurs through the clearance spaces 16 into the annular opening 32 within the housing 12, hence to outlet port 34 communicating with the return of the source 24 via passage 36.

Rotor spin is accomplished by tangential reaction jets 38, 40 (FIG. 3) supplied with fluid via radially extending passages 42, 44 which communicate with axial opening 30. Hence, the bearing and jet flows are supplied with a parallel fluid connection with axial opening 30, and the magnitude of these flows are not limited by each other, which is particularly advantageous in this context since the jet flow will ordinarily be much stronger than the bearing flow.

The jet flow likewise empties into the annular space 32 to be returned to the source 24 via conduit 36.

In order to provide a fluidic output signal and to restrain the rotor 14 in yaw, a pair of flapper nozzles 46, 48 are positioned in the housing so as to discharge their flow into the periphery of the rotor 14 so as to oppose each other. Fluid for this purpose is supplied via conduits 26.

These flapper nozzles 46, 48 are positioned in the yaw plane so as to serve the purposes referred to. Flow efflux therefrom will create a resilient restraining effect on the rotor hub 14, providing the equivalent of a fluid spring. It has been found that the natural frequency of the rotor hub 14 in yaw may be controlled by variations in pressure and flow to vary this effective spring rate. Hence, by so setting the natural frequency of the rotor hub well above that of the frequency of the lateral disturbances, good response of the rotor 14 thereto may be obtained. For a steel rotor two inches in diameter and one-half inch thick spinning at 2,000 rpm, 60 psig, and 1 gpm, supply flow will produce a natural frequency in yaw of 20 cps, which is well above the frequency of lateral disturbances and resultant yawing movements, usually of the order of 1 cps.

This arrangement also produces the fluidic output signal. By providing conduits 54, 56 connected to conduits 50, 52 respectively and also connected to a differential fluid amplifier 58, the variations in back pressure created at the flapper nozzles 46, 48 by responsive movement of the rotor 14 in response to vehicle yawing movement differential pressure signals corresponding to the rates of yaw in one direction or the other are provided at the outputs 60, 62 of the differential fluid amplifier 58. The amplifier 58 may be of conventional design, such as the dual output jet on jet type of amplifier.

These variations in back pressure are created by slight changes in clearance between the flapper nozzles 46, 48 and the rotor 14 periphery, with yawing movement tending to increase one clearance and decrease the other, depending on the direction of yaw. These signals are not dependent on the precise axial location of rotor 14 with respect to the flapper nozzles 46, 48 inasmuch as the differential back pressure is read at the fluid amplifier.

In order to render the rotor 14 insensitive to angular movements in the other major plane passing through the axis of the rotor 14, a pair of bearing pads 64, 66 (FIG. 1) are provided in the roll plane. As the spinning rotor 14 approaches either of these, a wedge of dynamic pressure is created by the action of the rotor on the fluid which substantially fills the housing 12 to balance the roll movement response of the rotor 14 without actual frictional contact.

In operation, fluid pressure from the source 24 causes flow via conduit 26 into the opening 30, and thence outwardly to center the rotor 14 in the housing 12. At the same time fluid flow occurs through passages 42, 44 and jets 38, 40 causing the rotor 14 to spin at a high rate of speed.

In the event of yawing movement to the right (as viewed in FIG. 2) the gyroscopic forces will tend to force the rotor 14 nearer the flapper nozzle 48 and further away from the flapper nozzle 46. The increase in pressure at nozzle 48 caused by the increase in the restrictive effect of the rotor 14 will then balance these gyroscopic forces, precluding further movement. Since the magnitude of the gyroscopic forces depends on the rate of yawing movement, this pressure will likewise vary with the rate of yawing movement.

Inasmuch as this basic phenomenon involved in flapper nozzle arrangements is well known in the prior art, it is not felt necessary to explain this in greater detail.

This increase in pressure at flapper nozzle 48 is accompanied by a decrease in pressure at flapper nozzle 46, due to the increased clearance and resultant lessening of the restrictive effect on flow by the rotor 14.

These pressures are read at the fluid amplifier 58 to produce fluid output signals at 60, 62 the difference in which corresponds to the magnitude of the pressure differential between the flapper nozzles 46, 48 hence, providing a fluidic output signal indicative of yaw rate.

As soon as yawing movement ceases, the gyroscopic forces are abated, leading to equilization of the nozzle clearances and pressures, thus eliminating the pressure signal at 60.

Yawing movement to the left creates the reverse situation, leading to the generation of signals in outlets 60, 62, the difference in which corresponds to the magnitude of the rate of yawing movement.

FIG. 4 shows in schematic form the incorporation of this gyro into a power steering supply circuit.

The power steering supply pump 68 provides fluid flow via line 70 to a hydraulic servoactuator assembly 72, including a servo valve 74 and a fluid motor 76. The details of a suitable assembly are disclosed in copending application entitled, "Hydraulic Servoactuator Arrangement for an Adaptive Steering System" by the present inventor Ser. No. 21,323, filed Mar. 20, 1970.

The fluid supplied via line 70 passes through the servo valve 74 which is of open center design with a controlled diversion of a portion of the fluid to the fluid motor 76, as described in detail in the above-referenced application. A pressure relief 78 is provided to prevent excessive pressure demands for the fluid motor 76, so as to provide sufficient flow for the requirements of the steering gear 80 which is supplied via conduit 82, and other downstream components.

The hydraulic rate gyro 10 is supplied via line 84 and line 26 with the return flow being connected to the power steering return line 86 via line 36.

The differential pressure signal lines 54 and 56 are connected to a differential amplifier 88, which is designed to sum the other fluidic control signals, such as a vehicle speed sensor 92 together with the yaw rate pressure signals and produce amplified output signals in lines 94, 96 indicative of the magnitude of the need for corrective action by the fluid motor 76.

These signals are applied to the servo valve 74 which in turn provides an output motion tending to compensate for lateral disturbances in the manner disclosed in detail in the above-referenced applications.

It will be appreciated that many variations of the above embodiment are possible within the scope of the invention. For example, the flapper nozzles may in the alternative be positioned directly opposite each other rather than on the same side of the rotor on opposite sides of the spin axis.

From the above description, it can be appreciated that a fluid rate gyro has been provided which is extremely simple and reliable and may be incorporated into an adaptive steering system to great advantage.

I claim:

1. A fluid gyro comprising:
   a housing:
   a rotor disposed in said housing;
   fluid support means for creating a rotatably fluid support for said rotor in said housing including means providing fluid flow through at least one clearance space between said rotor and said housing;
   reaction means for creating fluid flow out of said rotor so as to cause said rotor to spin;
   fluid supply means supplying fluid to said fluid support means and said reaction means in parallel; and
   a pair of opposed fluid outlets disposed to apply parallel fluid jets at said rotor opposing angular movement of said rotor out of the plane of spin; and
   means for sensing the pressure upstream of said jets, and wherein said fluid supply means also supplied fluid to said outlets, whereby the rate of angular movement is sensed by said pressure sensing means.

2. The gyro of claim 1 wherein said fluid outlets are connected with said fluid supply means in parallel with said support means and said reaction means.

3. A fluid gyro comprising:
   a housing;
   a rotor disposed in said housing;
   fluid support means for creating a rotatably fluid support for said rotor in said housing including means providing fluid flow through at least one clearance space between said rotor and said housing and further includes spherical complemental surfaces formed on a hub portion of said rotor and on said housing with said at least one clearance space being therebetween, said hub surface being disposed inwardly of said housing surface;
   reaction means for creating fluid flow out of said rotor so as to cause said rotor to spin and including at least one radially directed passage in said rotor communicating with a peripheral outlet;
   fluid supply means supplying fluid to said fluid support means and said reaction means in parallel, and including a source of fluid pressure and an axial passageway in said rotor in direct communication with said at least one clearance space, said at least one radial passage, and said source of fluid pressure; and
   a pair of fluid outlets disposed on either side of the spin axis of said rotor and disposed to direct fluid streams axially at said rotor, opposing angular movements thereof out of the plane of spin, whereby the rate of angular movement is sensed by said pressure sensing means.

4. The gyro of claim 3 wherein said fluid outlets are connected directly to said source of fluid pressure.

5. The gyro of claim 4 further including means for sensing the pressure difference immediately upstream of said outlets whereby a sensing of the rate of angular movement is provided.

6. A method for detecting rates of angular movement of a body in response to disturbances of a range of frequencies including:
   mounting a gyro to said body including a housing, a rotor rotatably mounted in said housing, spinning said rotor about an axis transverse to said angular movements, and resiliently restraining said rotor from angular movement relative to said housing in response to said disturbances by axially directing opposing fluid streams at the rotor periphery of sufficient momentum to provide a rotor natural frequency in said mode of angular movement substantially higher than said range of disturbance frequencies, and producing a signal corresponding to the movement of the rotor against the restraining effect of the fluid streams.

* * * * *